Patented July 28, 1931

1,816,140

UNITED STATES PATENT OFFICE

WALTER M. BAIN, OF CAMAS, WASHINGTON

PROCESS FOR COLORING PARAFFIN WAX AND THE LIKE

No Drawing.  Application filed October 22, 1929. Serial No. 401,629.

My invention relates to a process for coloring paraffin wax and the like.

Heretofore in the manufacture of colored paraffin wax which is used for candles and waxed paper and the like, the coloring processes in present use have been unsatisfactory in that they are relatively costly and the colors so produced fade, in other words, these processes do not always produce colors fast to light.

Therefore the object of my invention is to provide an inexpensive and economically commercial process for coloring paraffin wax so that the latter may be used for all the purposes for which it is now used, particularly candles and waxed paper.

A further object of my invention is to provide a process for coloring paraffin wax wherein by reason of the colors so produced being relatively fast to light the particular shades can always be duplicated.

Further, the use of commercial dye alone has been found impractical in that these dyes can only with difficulty be dissolved in the paraffin wax and especially prepared dyes which are treated so as to be easily soluble in the said paraffin wax are now used, which however, are costly, and unsatisfactory in that the colors so produced are not always light fast.

At present it is the practice to melt the paraffin wax and intermix therewith the especially prepared dyes, which have been so treated as to be soluble in the melted paraffin.

I have discovered that the common dry aniline dyes, as auramine, may be readily dissolved in the melted paraffin wax by first dissolving the dyes in a soap which is, in itself, readily soluble in organic liquids such as melted paraffin wax.

I further have discovered that such a soap may be formed by the reaction of a base as an ethanolamine of the class of alkyl amines and a fatty acid as commercial stearic or oleic acid which combine in molecular proportions and in which the said commercial dyes are readily soluble and the resulting solution being soluble in the melted paraffin wax.

I have further discovered that the best results are obtained by using a slight excess of the fatty acid, in that a better color is thus produced in the melted paraffin.

There are three ethanolamines, namely, monoethanolamine, diethanolamine, and triethanolamine, and while my process anticipates the use of other alkyl amines or aryl amines, I prefer to use triethanolamine which is a mixture of all three of the ethanolamines, all of which are quite similar and have the same characteristics and any of which I may use, with satisfactory results, but the commercial triethanolamine is considerably cheaper at the present time and more easily obtainable than any of the refined ethanolamines by themselves.

The pure triethanolamine is represented by the formula:

But the commercial grade contains approximately seventy-five to eighty per cent triethanolamine, twenty to twenty-five per cent diethanolamine and naught to five per cent monoethanolamine.

As mentioned, the commercial triethanolamine combines with the fatty acid to form a soap which is the case of stearic acid produces a substantially transparent, solid soap, soluble in organic liquids, specifically melted paraffin wax.

In carrying out my process there is no preferred order in which the various compounds are to be combined. For convenience I prefer to mix the dye in suitable proportions to produce the required shade of color with the triethanolamine, which is then dissolved in the stearic acid, the proportion of stearic acid being slightly in excess of the ethanolamine. The stearic acid may be melted for convenience in handling, or it may be intermixed cold and then melted if desired. I then introduce the intermixed dye, triethanolamine and stearic acid into the melted paraffin wax upon which the whole mixture takes the color of the dye.

Further in the coloring of candles, the said candle wax from which they are commonly made contains a substantial proportion of stearic acid (as much as twenty-five per cent) in which case the dye and triethanolamine are introduced directly into the melted candle wax, the stearic acid present in the candle wax combining with the triethanolamine to form the soap in which the die will be dissolved and then the resulting solution will be dissolved in the paraffin wax.

Since the triethanolamine combines with the fatty acid in molecular proportions, the exact quantities of the acid and the base are unimportant, except that a slight excess of the acid tends to produce a better color, as before mentioned. Beyond this, any excess of either may be disregarded, as they will have no effect on the result, so long as the dye is properly dissolved. Of course, in the interest of economy, a substantial excess of either would not be used.

The quantity of dye to be used is controlled by the color and shade desired which may be determined by the quantity of dye intermixed in the triethanolamine stearic or by the relative quantity of the latter dissolved in the melted paraffin.

I have found that other fatty acids may be used with satisfactory results, the limiting factor in this respect being their obtainability and cost.

I claim:

1. The process of coloring paraffin wax which consists in melting the wax, dissolving a selected dye in an ethanolamine to impart to the latter the desired shade of color, dissolving the ethanolamine in a fatty acid to form a soap soluble in melted paraffin wax and dissolving the soap in the melted paraffin wax.

2. The process of coloring paraffin wax which consists in melting the wax, dissolving a selected dye in commercial triethanolamine to impart to the latter the desired shade of color, dissolving the triethanolamine in a fatty acid to form a soap soluble in melted paraffin wax, and dissolving the soap in the melted paraffin wax.

3. The process of coloring paraffin wax which consists in melting the wax, dissolving a selected dye in an ethanolamine to impart to the latter the desired shade of color, dissolving the ethanolamine in an excess of fatty acid to form a soap soluble in melted paraffin wax and dissolving the soap in the melted paraffin wax.

4. The process of coloring paraffin wax which consists in melting the wax, dissolving a selected aniline dye in an ethanolamine to impart to the latter the desired shade of color, dissolving the ethanolamine in a slight excess of fatty acid to form a soap soluble in melted paraffin wax, and dissolving the soap in the melted paraffin wax.

5. The process of coloring paraffin wax containing a proportion of stearic acid, which consists in melting the wax, dissolving a selected dye in an ethanolamine to impart to the latter the desired shade of color and dissolving the mixture of dye and ethanolamine in the melted paraffin wax, whereby the stearic acid in the latter forms with the ethanolamine a soap soluble in the melted paraffin wax.

6. The process of coloring paraffin wax containing a proportion of stearic acid, which consists in melting the wax, dissolving a selected aniline dye in an ethanolamine to impart to the latter the desired shade of color and dissolving the mixture of dye and ethanolamine in the melted paraffin wax, whereby the stearic acid in the latter forms with the ethanolamine a soap soluble in the melted paraffin wax.

7. The process of coloring paraffin wax which consists in dissolving a selected dye in an ethanolamine to impart to the latter the desired shade of color, and dissolving the ethanolamine in melted paraffin wax in the presence of a fatty acid having the property of forming a soap with the ethanolamine soluble in the melted paraffin.

WALTER M. BAIN.